United States Patent
Luo et al.

(10) Patent No.: US 11,162,672 B2
(45) Date of Patent: Nov. 2, 2021

(54) LUMINAIRE WITH CHANGEABLE BEAM ANGLE AND FIXED CENTER BEAM CANDLE POWER

(71) Applicant: LEDVANCE GmbH, Garching bei Munich (DE)

(72) Inventors: Jinhui Luo, Shenzhen (CN); Zhian Li, Shenzhen (CN); Jianxiong Deng, Shenzhen (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 36 days.

(21) Appl. No.: 16/811,343

(22) Filed: Mar. 6, 2020

(65) Prior Publication Data
US 2020/0284417 A1    Sep. 10, 2020

(30) Foreign Application Priority Data

Mar. 6, 2019  (CN) .......... 201910167505.X (51) Int. Cl.
| | |
|---|---|
| *F21V 23/04* | (2006.01) |
| *F21V 23/00* | (2015.01) |
| *F21V 14/06* | (2006.01) |
| *F21S 6/00* | (2006.01) |
| *F21V 23/02* | (2006.01) |
| *G01D 5/244* | (2006.01) |
| *F21Y 115/10* | (2016.01) |
| *G01D 5/347* | (2006.01) |

(52) U.S. Cl.
CPC .......... *F21V 23/0492* (2013.01); *F21S 6/003* (2013.01); *F21V 14/06* (2013.01); *F21V 23/003* (2013.01); *F21V 23/02* (2013.01); *F21Y 2115/10* (2016.08); *G01D 5/244* (2013.01); *G01D 5/3473* (2013.01)

(58) Field of Classification Search
CPC .... F21V 23/0492; F21V 23/003; F21V 23/02; F21V 14/06; F21S 6/003
See application file for complete search history.

(56) References Cited

FOREIGN PATENT DOCUMENTS

| CA | 2721486 A1 | * | 10/2009 | .............. F21S 9/043 |
| CA | 2830991 C | * | 11/2020 | ........... H05B 47/115 |

* cited by examiner

*Primary Examiner* — Joseph L Williams
(74) *Attorney, Agent, or Firm* — Hayes Soloway PC (57) ABSTRACT

A lighting device with changeable beam angle and fixed center beam candle power. The device may include a light source, an electronic driver for driving the light source to emit light, a beam shaping element for shaping a beam of light emitted by the light source, a beam angle adjustment mechanism configured to change a positional relationship between the light source and the beam shaping element, and a sensor configured to provide a signal indicative of a setting of the beam angle adjustment mechanism. The electronic driver is configured to adjust the luminous flux emitted by the light source depending on the signal provided by the sensor. Such a lighting device may keep the center beam candle power of the emitted light constant when the beam angle is changed.

20 Claims, 5 Drawing Sheets

LUMINAIRE WITH CHANGEABLE BEAM ANGLE AND FIXED CENTER BEAM CANDLE POWER

CROSS-REFERENCE TO RELATED APPLICATIONS

This application claims the benefit of CN Application No. 201910167505.X filed Mar. 6, 2019, which is hereby incorporated by reference herein in its entirety.

TECHNICAL FIELD

The present invention relates to a luminaire with changeable beam angles and fixed center beam candle power.

BACKGROUND

Two important parameters of luminaires are the beam angle of the emitted light and the center beam candle power (CBCP). Center beam candle power is the luminous intensity along the geometric centerline of a directional light source. Usually, the center beam candle power (often also written as center beam candlepower) is also the maximum candlepower. The center beam candle power is also called center-beam intensity.

In luminaires with a fixed beam angle, the CBCP usually is also fixed.

In luminaires having a changeable beam angle, the CBCP usually changes when the beam angle is changed. For example, when the beam angle is increased, the same amount of light is distributed over a larger solid angle, resulting in a decreased CBCP. This may be especially undesirable for workplaces. On the other hand, when the beam angle is decreased, the same amount of light is distributed over a smaller solid angle, resulting in an increased CBCP. This may be dangerous as persons within the light beam might be blinded. It may also be possible that antiques in a museum may become damaged if the CBCP gets too high.

SUMMARY OF THE INVENTION

In light of the foregoing, the present disclosure generally relates to a luminaire with a changeable beam angle and fixed center beam candle power.

This object is solved by a lighting device according to the independent claim. It should be noted that, while the following provides a series of examples of the luminaire, other configurations may be utilized without departing from the scope of the claims.

A lighting device according to the present invention comprises a light source. The light source may comprise one or more semiconductor light emitting elements such as light emitting diodes (LED). The lighting device further comprises an electronic driver for driving the light source to emit light. The electronic driver, in particular, is adapted to convert electrical energy supplied to the lighting device from the supplied parameters (voltage, current, frequency) to the parameters required by the light source and further electronic components of the lighting device.

The lighting device also comprises a beam shaping element for shaping a beam of light emitted by the light source when the light source is supplied with electrical energy. The beam shaping element may be a reflective and/or a refractive optical element. The beam shaping element may thus change the direction of light beams being reflected by and/or transmitted through the beam shaping element. In particular, the beam shaping element may be a lens or a reflector.

The lighting device further comprises a beam angle adjustment mechanism configured to change a positional relationship between the light source and the beam shaping element. By changing the positional relationship between the light source and the beam shaping element, the direction of the light beams being reflected by and/or transmitted through the beam shaping element may be changed in different ways, thus changing the beam angle of the light emitted by the lighting device.

The lighting device also comprises a sensor configured to provide a signal indicative of a setting of the beam angle adjustment mechanism. In other words, the sensor is configured to provide a signal indicating the positional relationship between the light source and the beam shaping element. As the beam angle of the light emitted by the lighting device depends on the relative positional relationship between the light source and the beam shaping element, as explained above, the signal from the sensor is also indicative of the beam angle of the light emitted by the lighting device.

According to the invention, the electronic driver is configured to adjust the luminous flux emitted by the light source depending on the signal provided by the sensor. Thus, it is possible for the electronic driver to adjust the luminous flux emitted by the light source (i.e., to dim the light source) based on the beam angle of the light emitted by the lighting device.

Further, it is possible to adjust the luminous flux emitted by the light source in a way to keep the center beam candle power (CBCP) essentially constant and independent from the beam angle. In a setting of the beam angle adjustment mechanism where the beam angle is minimal (i.e., the smallest beam angle possible for the lighting device), the luminous flux emitted by the light source will be reduced as all of the light emitted by the lighting device will be concentrated in a small area. On the other hand, in a setting of the beam angle adjustment mechanism where the beam angle is maximal (i.e., the largest beam angle possible for the lighting device), the luminous flux emitted by the light source will be increased as all of the light emitted by the lighting device will be spread out over a larger area.

The lighting device may also comprise processing means configured to convert the signal provided by the sensor into a value for the beam angle, and to determine the required adjustment of the luminous flux emitted by the light source. The processing means may be configured to calculate the required adjustment of the luminous flux from the value of the beam angle or directly from the signal provided by the sensor. Alternatively, the processor may use a lookup table to determine the required adjustment of the luminous flux from the value of the beam angle or directly from the signal.

In an embodiment, the electronic driver may also be configured to allow for adjusting the luminous flux emitted by the light source independently from the signal provided by the sensor. Thus, the brightness of the lighting device may be adjusted by a user to a desired value. The CBCP for this setting may then be kept constant, when the beam angle of the lighting device is changed, as described above.

In an embodiment, the beam angle adjustment mechanism is configured to change a distance between the light source and the beam shaping element. In embodiments where the beam shaping element is a lens or a reflector, this will change the distance between the light source and the focal point of the beam shaping element, thus changing the divergence of the light beams being reflected by and/or transmitted through the beam shaping element and, accordingly, changing the beam angle.

In an embodiment, the beam angle adjustment mechanism comprises a first component in a fixed positional relationship with the light source and a second component in a fixed positional relationship with the beam shaping element. In other words, the light source is mounted, either directly or indirectly to the first component and the beam shaping element is mounted, either directly or indirectly mounted to the second component.

The first component and the second component may be movable, with respect to each other. The movement may be translationally and/or rotationally. In one embodiment, the first component and the second component may be movably connected by a movement mechanism. The movement mechanism may be a sliding mechanism and/or a rotation mechanism.

In an embodiment, the first component and the second component of the beam angle adjustment mechanism are threadedly engaged with each other. The first component and the second component may both have an essentially tubular shape, with a first thread on the outside of one of the two components and a second thread, corresponding to the first thread on the inside of the other one of the two components. Rotating the two components with respect to each other results in a telescoping movement and, thus, may change the distance between light source and beam shaping element. The beam shaping element in this embodiment may be a lens held by one of the two components of the beam angle adjustment mechanism. The other component may be attached to the housing holding the light source or be an integral part thereof.

In an embodiment, the signal indicative of a setting of the beam angle adjustment mechanism is a signal indicative of a distance between the light source and the beam shaping element.

In an embodiment, the sensor may comprise a variable resistor, for example a sliding resistor, a potentiometer, or a rheostat. Moving the beam shaping element with respect to the light source (or the two components of the beam shaping mechanism with respect to each other) either by translation or by rotation may change the setting of the variable resistor and thus its resistance value. In such embodiments, the resistance value may be indicative of the setting of the beam angle adjustment mechanism. The resistance value may be converted into an electrical signal, for example by means of a voltage divider.

In an embodiment, the sensor may comprise a rotary encoder, or a similar device that converts an angular position or motion of a component to analog or digital output signals. The rotary encoder may be an absolute rotary encoder converting the absolute angular position into an absolute signal. The rotary encoder may also be an incremental rotary encoder converting a change in angular position into an incremental signal. In the latter case, the processing means may be configured to determine the absolute position from the increment signal.

The rotary encoder may be an optical rotary encoder. The optical rotary encoder may comprise an encoding element and an optical element such as a photodiode for reading the encoding element.

The rotary encoder may also be a magnetic rotary encoder. The magnetic encoder may comprise a magnet and a magnetic sensor such as a Hall effect sensor.

In an embodiment, the lighting device comprises a first magnet and a second magnet. The sensor comprises a Hall effect sensor located between the first magnet and the second magnet. The first magnet may be in a fixed positional relationship with the light source and the second magnet may be in a fixed positional relationship with the beam shaping element. Thus, changing the distance between the light source and the beam shaping element also changes the distance between the two magnets and, accordingly, the magnetic field between the two magnets. This change in magnetic field may be detected by the Hall effect sensor.

In an embodiment, the first magnet and/or the second magnet is ring-shaped. Thus, rotation of the ring-shaped magnet with respect to the other magnet without changing the distance therebetween does not change the magnetic field between the two magnets.

While the present invention is described herein for a luminaire, a lighting device according to the present invention may also be a lamp.

BRIEF DESCRIPTION OF THE DRAWINGS

Preferred embodiments of the invention will be explained in the following, having regard to the drawings. It is shown in.

DETAILED DESCRIPTION OF THE INVENTION

In the following, preferred embodiments of the invention will be described with reference to the drawings. The same or similar elements or elements having the same effect may be indicated by the same reference number in multiple drawings. Repeating the description of such elements may be omitted in order to prevent redundant descriptions.

Figure 1A:
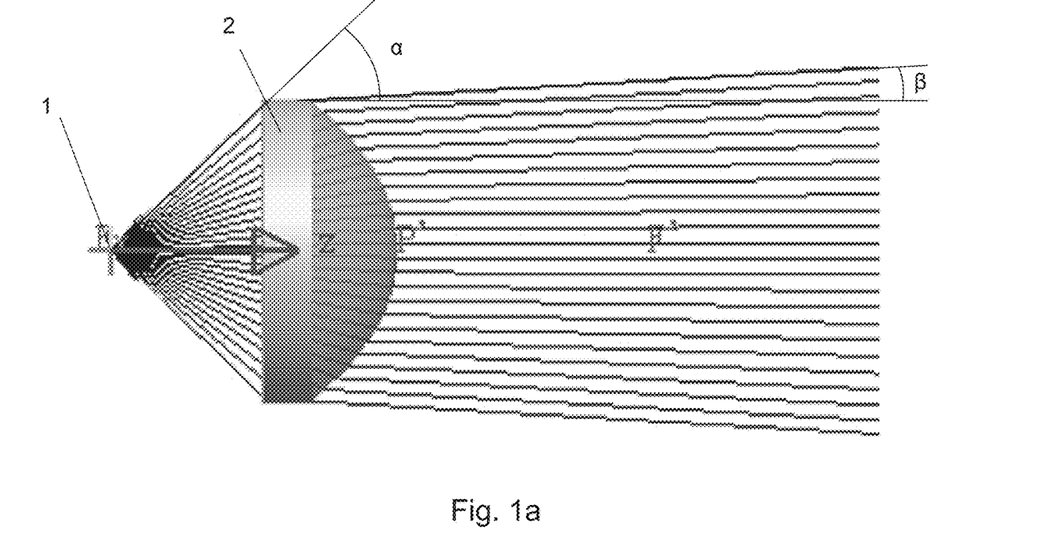
FIG. 1a depicts the beam angle at a first distance between a light source and a beam shaping element.
Figure 1B:
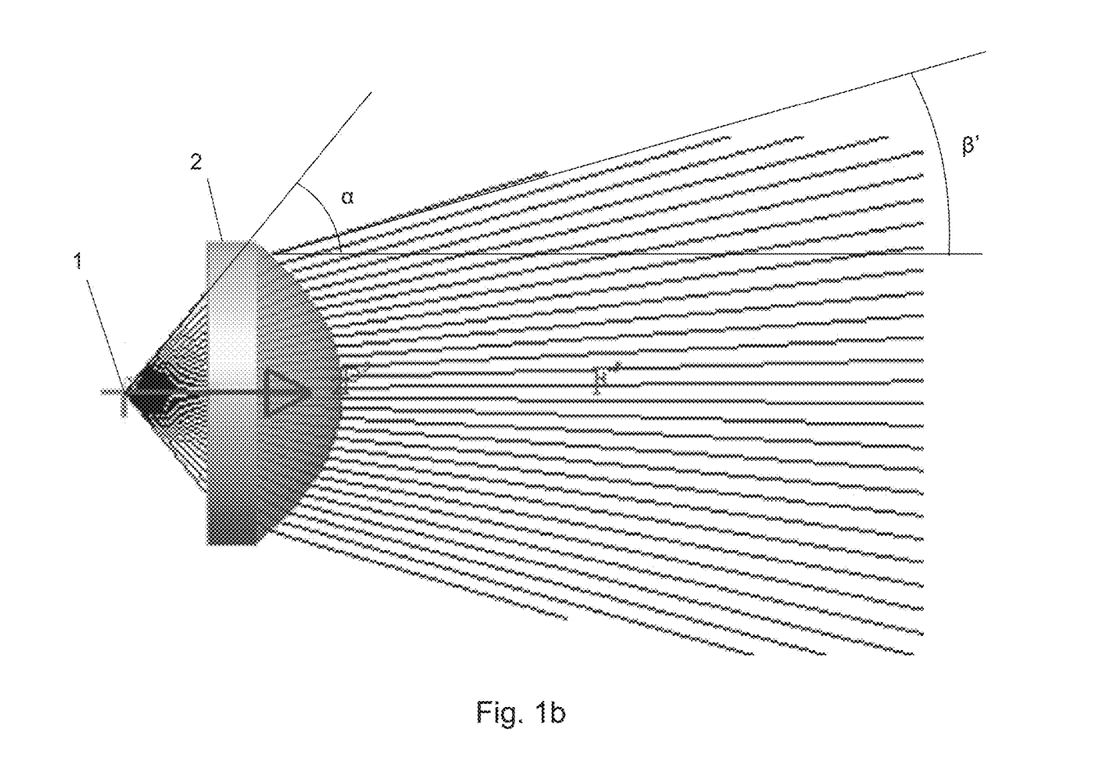
FIG. 1b depicts a second beam angle at a second distance between light source and beam shaping element.

FIGS. 1a and 1b depict schematically the change in beam angle depending on a distance between light source and beam shaping element. The drawings show a light source 1 (such as an LED) emitting light in a cone with a first angle α around a main direction z. The emitted light is incident on a beam shaping element in the form of a lens 2. The lens 2 shown in these drawings is a plano-convex lens, but other types of lenses may also be used. The lens 2 collimates the beam of light emitted by the light source 1 such that the beam exiting the lens 2 has a smaller angle β or β' depending on the distance of the light source 1 from the lens 2.

Figure 2:
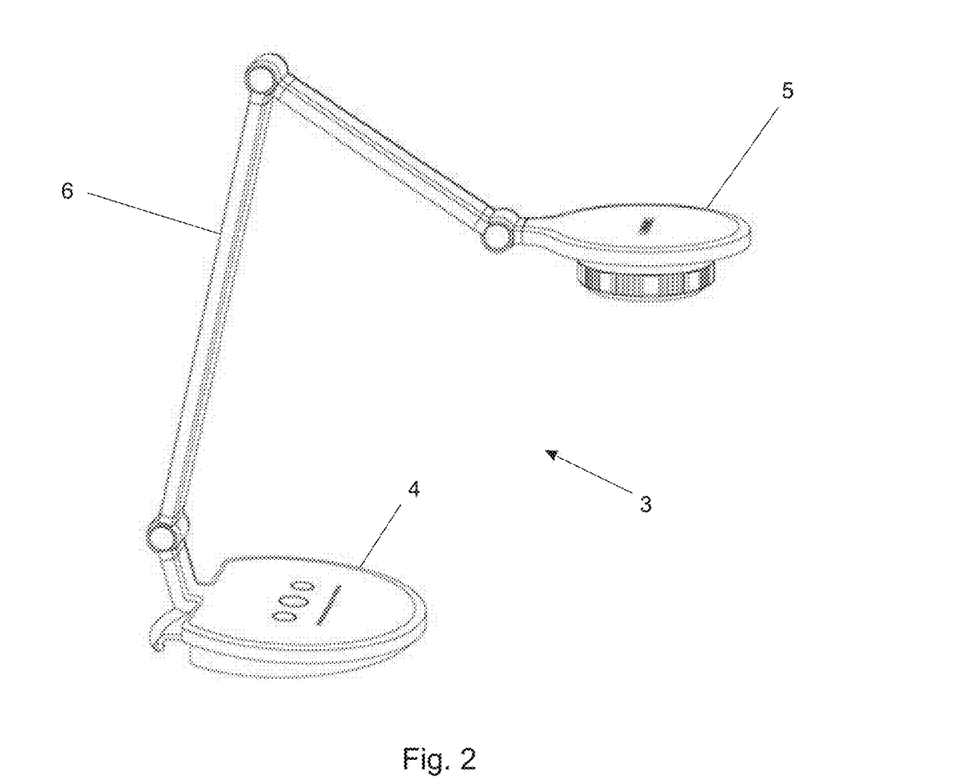
FIG. 2 is an embodiment of a lighting device according to the present invention.

FIG. 2 shows an embodiment of a lighting device according to the present invention. The lighting device is a luminaire 3 in the form of a desk lamp. The luminaire 3 has a base 4 and a light emitting unit 5 connected to the base 4 via a segmented movable arm 6. The base may comprise control elements such as buttons and/or switches for operating the luminaire 3. Electrical connections from the base 4 to the light emitting unit 5 may run through the arm 6. An electronic driver (not shown) may be located in the base 4 or in the light emitting unit 5 of the luminaire 3.

Figure 3A:
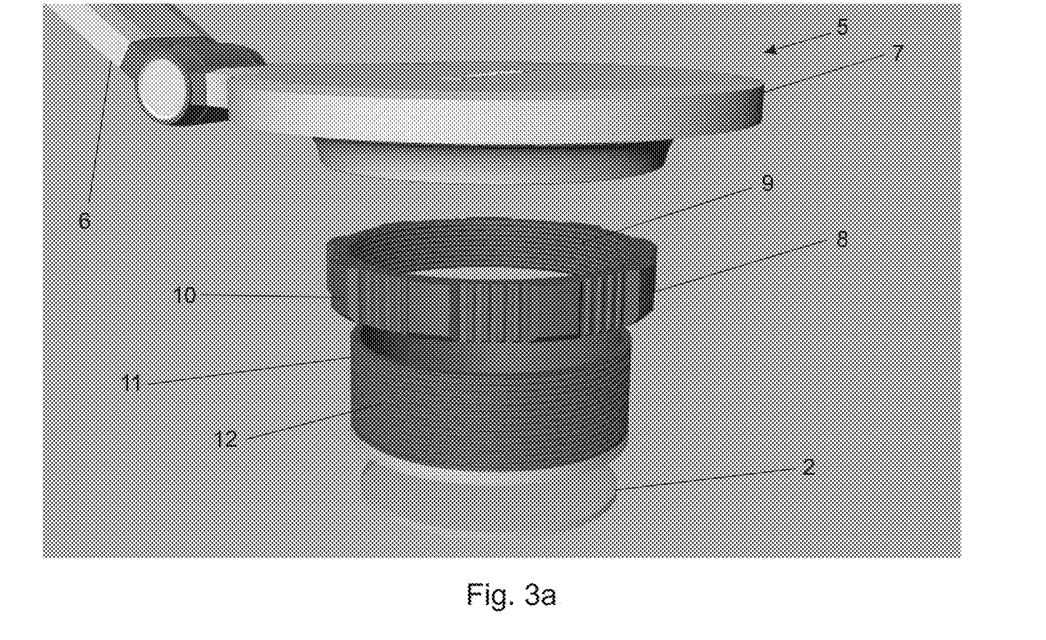
FIG. 3a is a portion of the embodiment of FIG. 2 in an exploded view.

FIG. 3a depicts the light emitting unit 5 in an exploded view in more detail. The light emitting unit 5 comprises a main body 7 connected to the arm 6 of the luminaire 3. A light source (not shown in FIG. 3a) in the form of one or more LEDs is mounted in the main body 7 and electrically connected to the electronic driver. A beam shaping element in the form of a lens 2 is mounted to the main body 7 via a beam angle adjustment mechanism.

The beam angle adjustment mechanism comprises a first tubular component 8 having a thread 9 on its inner surface, an internal thread. The first tubular component 8 is mounted rotatably to the main body 7. In order to mount the first tubular component 8 to the main body 7, the main body 7 comprises one or more protrusions 7a, such as an annular protrusion or multiple tabs, and the first tubular component 8 comprises an annular recess, grooves, 8a receiving the protrusions 7a. Thus, the first tubular component can be mounted rotatably with respect to the main body 7. While the first tubular component 8 is rotatable with respect to the light source, such a rotation essentially does not change the positional relationship between light source and first tubular component 8. Therefore, the first tubular component 8 may be considered to be in a fixed positional relationship with the light source.

The first tubular component may also comprise a surface structure 10 on its outer surface to facilitate gripping and rotating the first tubular component 8 with respect to the main body 7.

The beam angle adjustment mechanism may further comprise a second tubular component 11 having a thread 12 on its outer surface, an external thread. The internal thread 9 of the first tubular component 8 and the external thread 12 of the second tubular component 11 are designed such they can engage with each other. Rotating the first tubular component 8 and the second tubular component 11 with respect to each other with their threads 9, 12 being engaged thus results in a relative longitudinal movement of the two tubular components 8, 11, in a telescoping movement. This movement, accordingly, changes the distance between the light source in the main body 7, to which the first tubular component 8 is attached, and the lens 2 attached to the second tubular component 11.

Figure 3B:
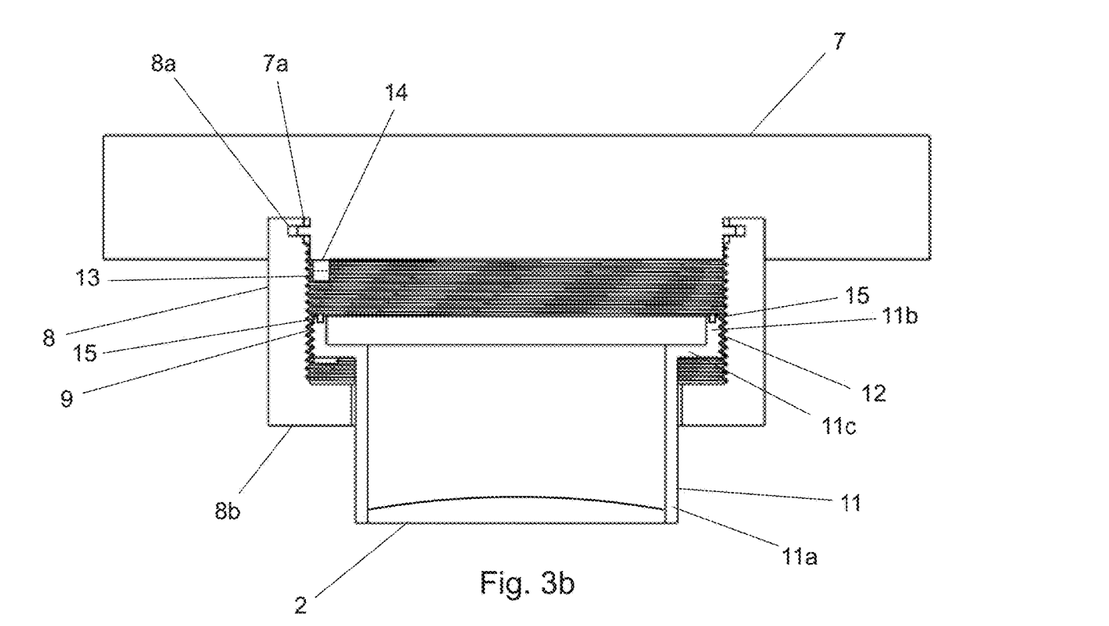
FIG. 3b depicts schematically the light emitting unit of an embodiment of a lighting device according to the present invention in a cross-sectional view.
Figure 3C:
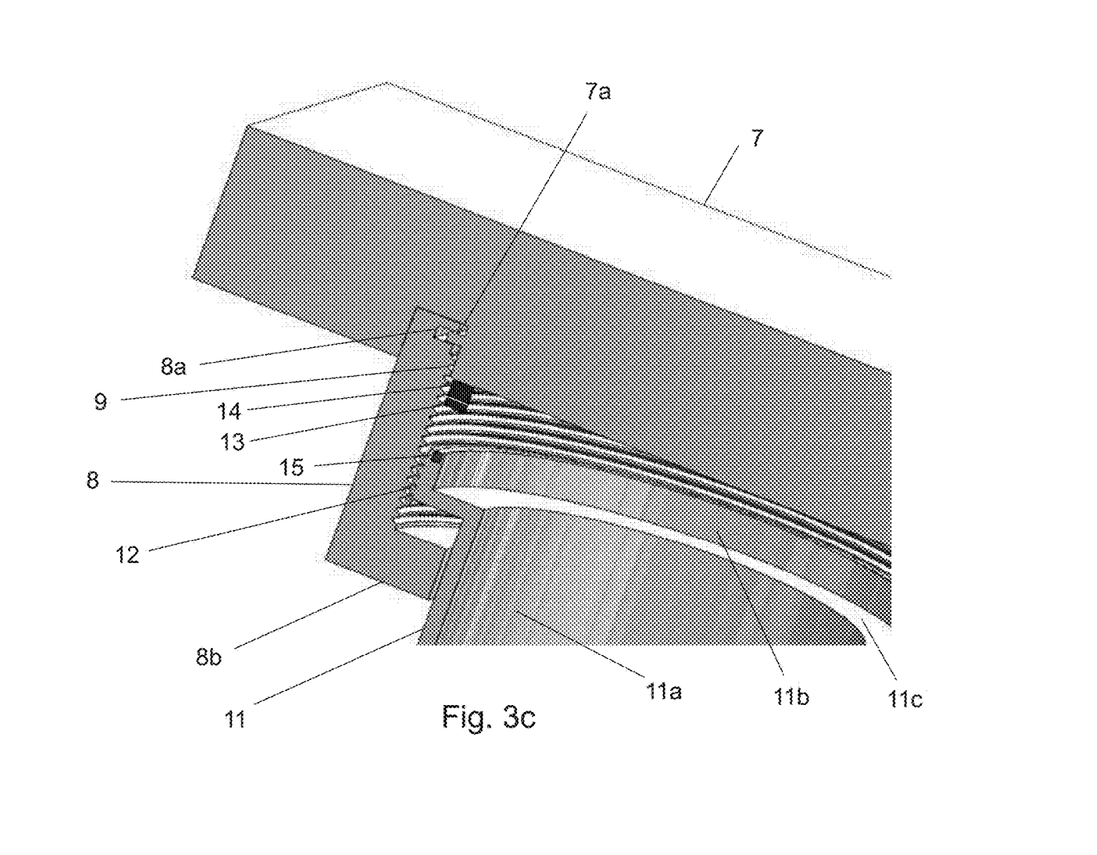
FIG. 3c depicts a section of FIG. 3b shown in more detail.

FIGS. 3b and 3c depict cross sectional views of the second tubular component 11. As shown in FIGS. 3b and 3c the second tubular component comprises a lower tubular section 11a and an upper tubular section, upper rim, 11b connected to each other via a flange-like, radial shoulder 11c. The thread 12 is located on the upper rim 11b and the lower tubular section 11a is guided by a flange-like, radial section 8b of the first tubular component 8. The interaction between the radial shoulder 11c of the second tubular component 11 and the radial section 8b of the first tubular component 8 prevents the second tubular component 11 from being removed from the first tubular component 8.

The main body 7 may also comprise a sensor 13 configured to sense the rotation of the first tubular component 8 and to provide a signal indicative of the angular position of the first tubular component 8. The signal from the sensor 13 may be sent to a processing means that may be part of the electronic driver or separate therefrom. The processing means may then derive the distance between light source and lens 2 and, from that distance, the beam angle of the light emitted by the light emitting unit 5.

Figure 3D:
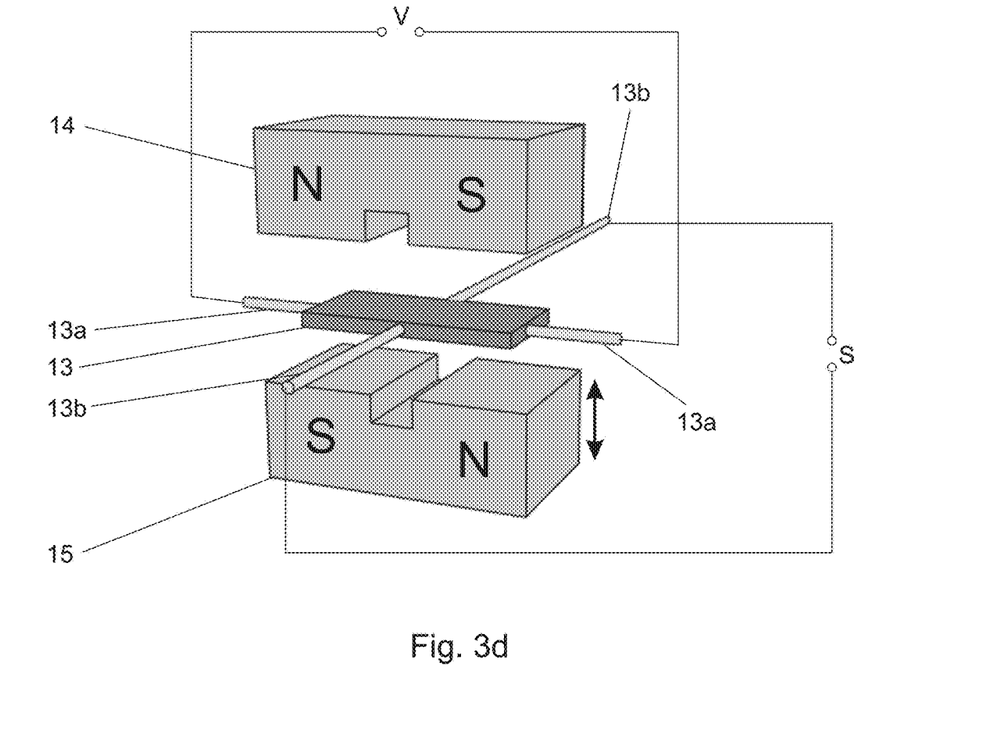
FIG. 3d is a schematic drawing of a sensor used in the embodiments of FIGS. 2, 3a, 3b, 3c.

The sensor may be a Hall effect sensor 13 as schematically shown in FIG. 3d. The Hall effect sensor 13 may be located between two magnets 14, 15. The Hall effect sensor 13 may be supplied with an operating voltage V via its two supply terminals 13a and may provide a signal S via its two signal terminals 13b depending on the magnetic field between the two magnets 14, 15 and, thus, on the distance between the two magnets 14, 15.

As schematically shown in FIG. 3c, the Hall effect sensor 13 and a first magnet 14 can be mounted on the main body 7 inside the first tubular component 8. The Hall effect sensor 13 and the first magnet 14 may be fixedly attached to the main body 7 and, thus, have a permanently fixed relationship to the main body 7.

A second magnet 15 may be mounted on the second tubular component 11, such that the distance between the two magnets is changed when the first tubular component 8 is rotated, changing the distance between the light source in the main body 7, to which the first tubular component 8 is attached, and the lens 2 attached to the second tubular component 11. The second magnet 15 may be ring-shaped and extend along the whole upper rim 11b of the second tubular component 11. Thus, the second tubular component 11 needs not to be rotationally fixed with respect to the first tubular component 8 as the magnetic field between the two magnets does not change when the second tubular component 11 rotates with respect to the first tubular component 8 without changing the distance therebetween.

In FIG. 3c, the second magnet 15 is shown inserted into the upper rim 11b of the second tubular component 11. In other embodiments, the second magnet can be attached to the top of the upper rim 11b or can be located inside the second tubular component 11 (for example attached to the inner surface of the upper rim 11b).

Figure 3E:
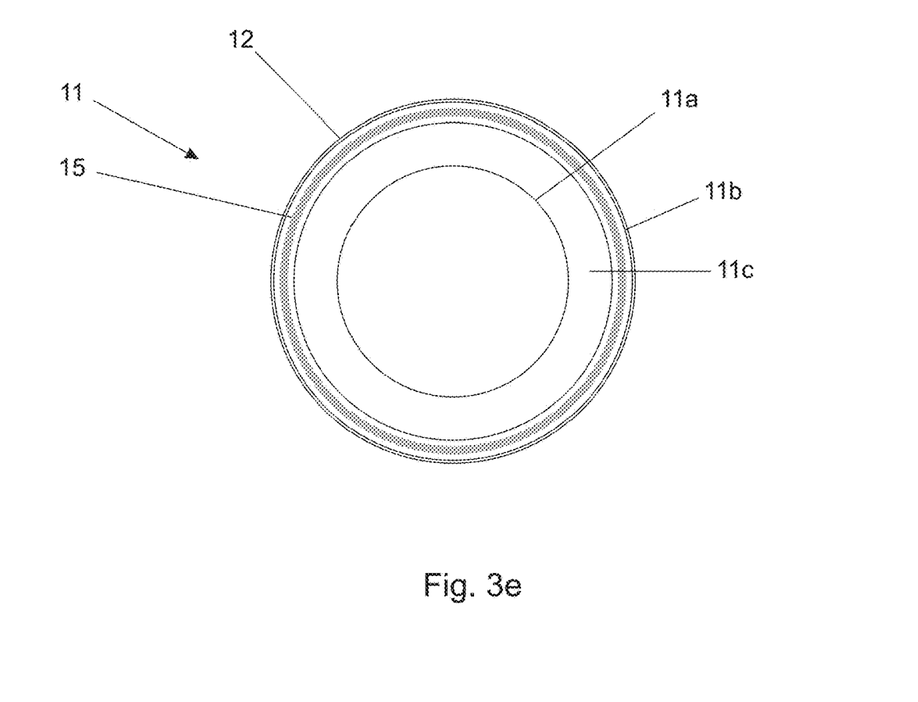
FIG. 3e is a schematic top view of the second tubular component used in the embodiment of FIGS. 3b and 3c.

FIG. 3e shows schematically the second tubular component 11 of the embodiment of FIGS. 3b and 3c in a top view. Here, the ring-shape of the second magnet 15 can be seen.

In some embodiments it may be possible to rotate the first tubular component 8 more than 360° with respect to the second tubular component 11, meaning the distance between light source and lens 2 may not directly be derivable from the signal from the sensor 13. In such an embodiment, the processing means may be configured to store the current value of the distance between light source and lens 2 and to use the signal from the sensor 13 as an incremental signal, indicative of the change of the distance, but not of the absolute value thereof.

Figure 4:
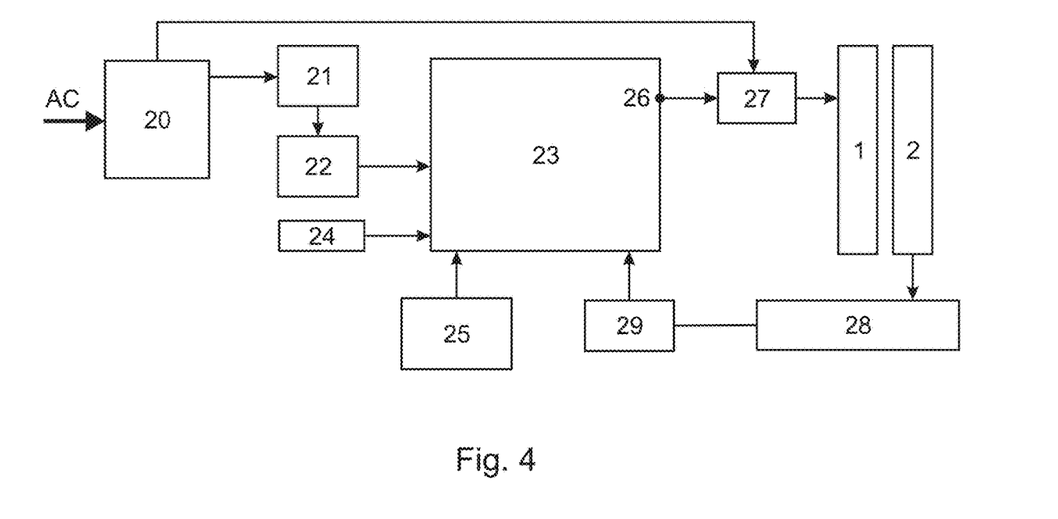
FIG. 4 is a block diagram of an embodiment of a lighting device according to the present invention.

FIG. 4 shows a block diagram of an embodiment of a lighting device according to the present invention, showing an embodiment of the electrical components thereof. The lighting device may comprise an AC/DC converter 20 that can be connected to a mains power supply AC and converts the alternating voltage supplied by the mains power supply to a direct voltage. The direct voltage is further converted to a voltage required for the further components. The direct voltage may be converted to 5 V DC by a buck converter 21 and, from these 5 V, to 3.3 V DC by a low-dropout (LDO) regulator 22. The resulting direct voltage may be supplied to a microcontroller 23.

In some embodiments a crystal resonator 24 may be used to provide a clock for the microcontroller 23. The microcontroller 23 may also be connected to a Serial Peripheral Interface (SPI) or an Electrically Erasable Programmable Read-Only Memory (EEPROM) 25 storing instructions for the microcontroller 23.

The microcontroller 23 may have a Pulse-Width Modulation (PWM) output 26 outputting a signal to a further DC/DC converter 27, for example the LM3404 available from Texas Instruments Incorporated, for driving one or more LEDs 1. The DC/DC converter 27 may be supplied with power from the AC/DC converter 20.

The lighting device may also have a beam shaping element, such as a lens 2 in a positional relationship with the LED 1. The positional relationship between LED 1 and lens 2 (or the change thereof) may be detected by a variable resistor 28. For example, movement of the lens 2 with respect to the LED 1 may result in a change of the resistance value of the variable resistor 28. The resistance value can be determined, and the corresponding analog signal may be input to the microcontroller 23 via an analog/digital converter (ADC) 29.

The microcontroller 23 determines the change in distance between LED 1 and lens 2 and, from the change in distance, determines the change in beam angle of the light emitted by the combination of LED 1 and lens 2. The microcontroller 23 then determines the required change in luminous flux for the center beam candle power to remain constant and changes the PWM signal output to the DC/DC converter 27 accordingly.

Figure 5:
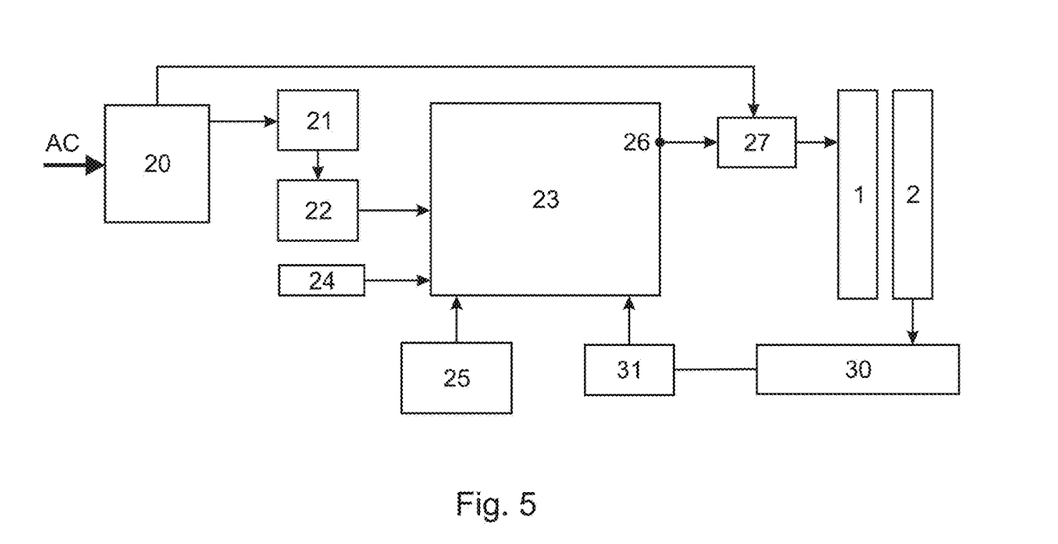
FIG. 5 is a block diagram of another embodiment of a lighting device according to the present invention.

FIG. 5 shows a block diagram of another embodiment of a lighting device according to the present invention, and electrical components thereof. The lighting device of FIG. 5 in many components corresponds to the lighting device of FIG. 4. The similar components will not be described again.

In the embodiment of FIG. 5, the positional relationship between LED 1 and lens 2 (or the change thereof) may be detected by a Hall effect sensor 30, such as the AH493 available from BCD Semiconductor Manufacturing Limited, measuring the magnetic field produced by a magnet. The Hall effect sensor 30 may be in a fixed positional relationship with the LED 1 and the magnet may be in a fixed positional relationship with the lens 2, or vice versa. Movement of the lens 2 with respect to the LED 1 may result in a change of magnetic field detected by the Hall effect sensor 30. The signal from the Hall effect sensor 30 may be amplified by an amplifier 31 and then input to the microcontroller 23.

In this embodiment the microcontroller 23 determines the change in distance between LED 1 and lens 2 from the signal form the Hall effect sensor 30 and from the change in distance, determines the change in beam angle of the light emitted by the combination of LED 1 and lens 2. It then determines the required change in luminous flux for the center beam candle power to remain constant and changes the PWM signal output to the DC/DC converter 27 accordingly.

Although the invention has been illustrated and described in detail by the embodiments explained above, it is not limited to these embodiments. Other variations may be derived by the skilled person without leaving the scope of the attached claims.

Generally, "a" or "an" may be understood as singular or plural, in particular with the meaning "at least one", "one or more", etc., unless this is explicitly excluded, for example by the term "exactly one", etc.

In addition, numerical values may include the exact value as well as a usual tolerance interval, unless this is explicitly excluded.

Features shown in the embodiments, in particular in different embodiments, may be combined or substituted without leaving the scope of the invention.

The invention claimed is:

1. A lighting device comprising:
a light source;
an electronic driver for driving the light source to emit light;
a beam shaping element in an optical path of the light source;
a beam angle adjustment mechanism in communication with at least one of the light source and the beam shaping element and configured to change a positional relationship between the light source and the beam shaping element; and
a sensor in communication with the electronic driver and configured to provide a signal indicative of a setting of the beam angle adjustment mechanism,
wherein the electronic driver is configured to adjust the light emitted by the light source depending on the signal provided by the sensor.

2. The lighting device according the claim 1, wherein the beam shaping element comprises at least one of a lens and a reflector.

3. The lighting device according to claim 1, wherein the beam angle adjustment mechanism is configured to change a distance between the light source and the beam shaping element.

4. The lighting device according to claim 1, wherein the beam angle adjustment mechanism comprises a first component in a fixed positional relationship with the light source and a second component in a fixed positional relationship with the beam shaping element, wherein the first component and the second component are movable with respect to each other.

5. The lighting device according to claim 4, wherein the first component and the second component are threadedly engaged with each other.

6. The lighting device according to claim 1, wherein the signal indicative of the setting of the beam angle adjustment mechanism is a signal indicative of a distance between the light source and the beam shaping element.

7. The lighting device according to claim 1, wherein the sensor comprises at least one of a variable resistor and a rotary encoder.

8. The lighting device according to claim 7, wherein the rotary encoder is an optical rotary encoder or a magnetic rotary encoder.

9. The lighting device according to claim 1, wherein the lighting device further comprises a first magnet and a second magnet, wherein the sensor comprises a Hall effect sensor located between the first magnet and the second magnet.

10. The lighting device according to claim 9, wherein at least one of the first magnet and the second magnet is ring-shaped.

11. The lighting device according to claim 1, wherein the light source comprises at least one light-emitting diode (LED).

12. The lighting device according to claim 1, wherein the beam shaping element comprises at least one of a reflective optical element and a refractive optical element.

13. The lighting device according to claim 1, wherein the beam angle adjustment mechanism is configured to change the positional relationship between the light source and the beam shaping element via a telescoping movement.

14. The lighting device according to claim 1, further comprising a processing element configured to communicate with the beam angle adjustment mechanism.

15. The lighting device according to claim 14, wherein the processing element comprises a microcontroller.

16. The lighting device according to claim 14, further comprising a memory element configured to communicate with the processing element.

17. The lighting device according to claim 1, wherein the lighting device is configured with a changeable beam angle and a fixed center beam candle power.

18. The lighting device according to claim 1, wherein the electronic driver is configured to allow for adjusting a luminous flux emitted by the light source independently from the signal provided by the sensor.

19. The lighting device according to claim 1, wherein the lighting device is configured as a luminaire comprising:
 a base;
 a light-emitting unit comprising the light source; and
 an arm connecting the base and the light-emitting unit.

20. The lighting device according to claim 1, wherein the lighting device is configured as a lamp.

* * * * *